United States Patent
Makke et al.

(10) Patent No.: US 10,951,590 B2
(45) Date of Patent: Mar. 16, 2021

(54) USER ANONYMITY THROUGH DATA SWAPPING

(71) Applicant: FORD GLOBAL TECHNOLOGIES, LLC, Dearborn, MI (US)

(72) Inventors: Omar Makke, Lyon Township, MI (US); Oleg Yurievitch Gusikhin, Commerce Township, MI (US); Haysam M. Kadry, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 205 days.

(21) Appl. No.: 16/132,913

(22) Filed: Sep. 17, 2018

(65) Prior Publication Data

US 2020/0092261 A1    Mar. 19, 2020

(51) Int. Cl.
| | |
|---|---|
| *H04L 29/06* | (2006.01) |
| *H04W 4/80* | (2018.01) |
| *H04W 4/44* | (2018.01) |
| *H04W 4/46* | (2018.01) |

(52) U.S. Cl.
CPC ......... *H04L 63/0421* (2013.01); *H04W 4/44* (2018.02); *H04W 4/46* (2018.02); *H04W 4/80* (2018.02)

(58) Field of Classification Search
CPC ......... H04L 63/04–0492; G04W 4/44; G04W 4/46; G04W 4/80
See application file for complete search history.

(56) References Cited

U.S. PATENT DOCUMENTS

| | | | |
|---|---|---|---|
| 2016/0219029 A1* | 7/2016 | Oshida | H04W 4/46 |
| 2016/0277435 A1 | 9/2016 | Salajegheh et al. | |
| 2017/0289098 A1* | 10/2017 | Chun | H04L 61/103 |
| 2017/0345228 A1* | 11/2017 | Dibb | G08G 1/017 |
| 2018/0098203 A1* | 4/2018 | Schultz | H04W 4/46 |

* cited by examiner

*Primary Examiner* — Aaron L Troost

(74) *Attorney, Agent, or Firm* — Michael J. Spenner; Brooks Kushman P.C.

(57) ABSTRACT

A size of collected data to swap is identified, over vehicle-to-vehicle communication between first and second vehicles. A first segment of data of the size stored to the first vehicle is swapped with a second segment of data of the size stored to the second vehicle over the vehicle-to-vehicle communication between the first and second vehicles. The swapped data received from the second vehicle is sent from the first vehicle to a server.

21 Claims, 6 Drawing Sheets

US 10,951,590 B2

USER ANONYMITY THROUGH DATA SWAPPING

TECHNICAL FIELD

Aspects of the disclosure generally relate to providing user anonymity when sending data from vehicles to a cloud service, by applying data swapping using vehicle-to-vehicle and vehicle-to-infrastructure techniques.

BACKGROUND

Vehicle telematics units may be utilized to allow a user of a vehicle to interact with services available over a communications network. These services may include turn-by-turn directions, telephone communications, vehicle monitoring, and roadside assistance. In some vehicles, telematics features may be used to provide vehicle diagnostic and other data to a remote cloud server, but with limited data content and reporting intervals.

SUMMARY

In one or more illustrative embodiments, a system includes a processor of a first vehicle programmed to record collected data from a plurality of vehicle systems, locate a second vehicle available over vehicle-to-vehicle communication to swap data with the first vehicle, identify a size of collected data to swap and a segment of data to swap of the identified size, and swap the collected data with the second vehicle to receive swapped data of the same size from the second vehicle.

In one or more illustrative embodiments, a method includes identifying, over vehicle-to-vehicle communication between the first and second vehicles, a size of collected data to swap; swapping, over the vehicle-to-vehicle communication between the first and second vehicles, a first segment of data of the size stored to the first vehicle with a second segment of data of the size stored to the second vehicle; and sending, from the first vehicle to a server, the swapped data received from the second vehicle.

In one or more illustrative embodiments, a non-transitory computer-readable medium comprising instructions that, when executed by a processor of a vehicle, causes the vehicle to identify, over vehicle-to-vehicle communication between first and second vehicles, a size of collected data to swap; swapping, over the vehicle-to-vehicle communication between the first and second vehicles, a first segment of data of the size stored to the first vehicle with a second segment of data of the size stored to the second vehicle; and send, from the first vehicle to a server, the swapped data received from the second vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It may be desirable for vehicles to collect data about vehicle operation and transmit that data to a central server for analysis. However, such a system may raise privacy and security concerns for the users whose data is being collected. This disclosure describes a system and a method in which data of vehicle users is collected, but then swapped between vehicles. To perform a swap, a random portion of vehicle data from a first vehicle is sent to a second vehicle, and a random portion of vehicle data from the second vehicle is sent back to the first vehicle. In doing so, the true origin of the data in question cannot be determined. Multiple swaps may be performed among different pairings of vehicles to further obfuscate the origin of the data. These swaps may be performed vehicle-to-vehicle, without use of data plans of the vehicles. Moreover, as the swapped portions of data may be of the same size, data plan use of the vehicles to transmit to the server is unaffected. Further aspects of the disclosure are discussed in detail below.

Figure 1:
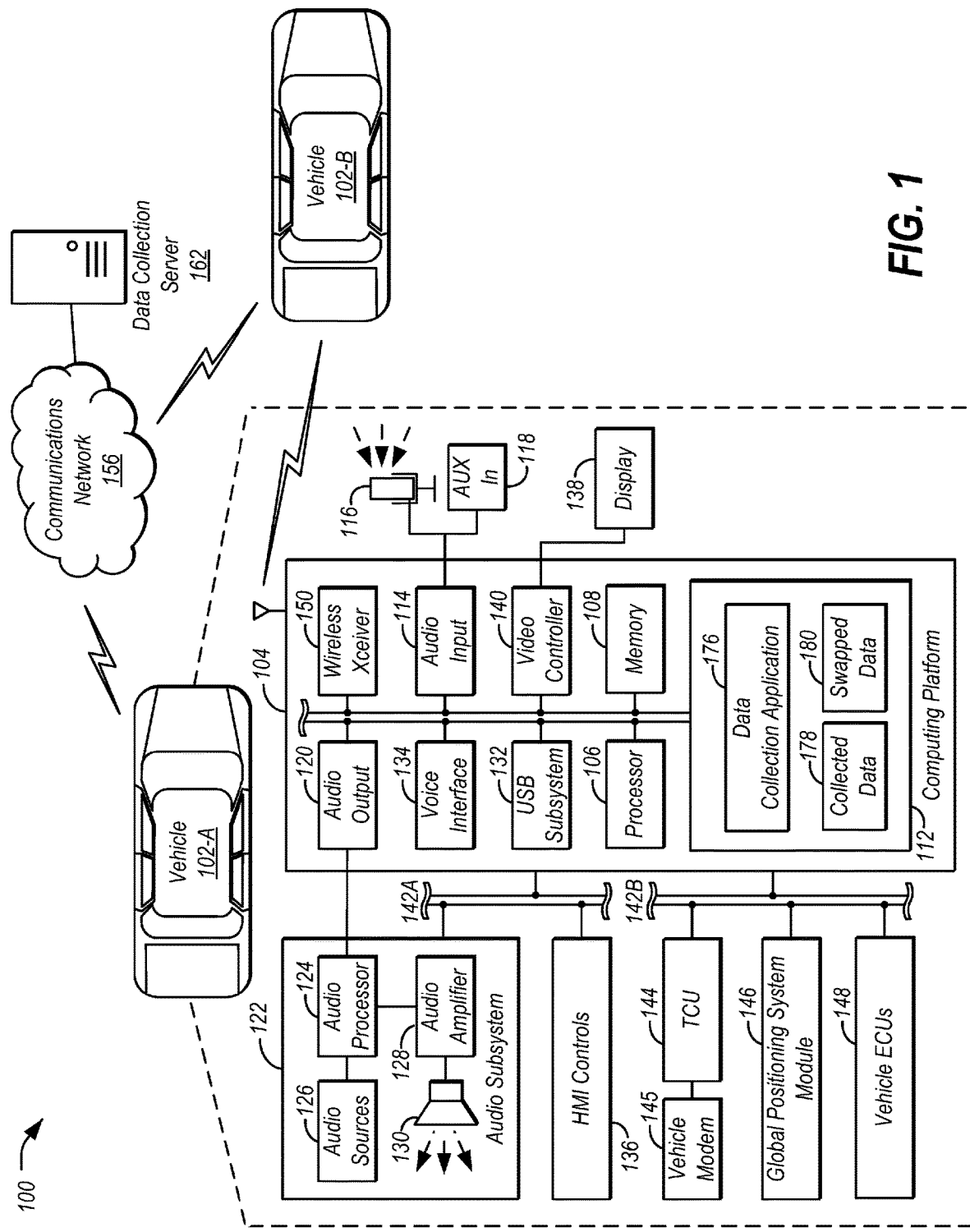
FIG. 1 illustrates an example diagram of a system configured to provide telematics services to a vehicle.

FIG. 1 illustrates an example diagram of a system 100 configured to provide telematics services to vehicles 102. As shown, the vehicle 102-A and the vehicle 102-B (collectively 102) may include various types of passenger vehicle, such as crossover utility vehicle (CUV), sport utility vehicle (SUV), truck, recreational vehicle (RV), boat, plane or other mobile machine for transporting people or goods. (The details of the vehicle 102-B may be similar to that of the vehicle 102-A, but are not shown for sake of clarity in the Figure.) Telematics services may include, as some non-limiting possibilities, navigation, turn-by-turn directions, vehicle health reports, local business search, accident reporting, and hands-free calling. In an example, the system 100 may include the SYNC system manufactured by The Ford Motor Company of Dearborn, Mich. It should be noted that the illustrated system 100 is merely an example, and more, fewer, and/or differently located elements may be used. For example, systems may include more vehicles 102, as well as more data collection servers 162 than shown.

A computing platform 104 may include a memory 108 and one or more processors 106 configured to perform instructions, commands, and other routines in support of the processes described herein. For instance, the computing platform 104 may be configured to execute instructions of vehicle applications to provide features such as navigation, accident reporting, satellite radio decoding, and hands-free calling. Such instructions and other data may be maintained in a non-volatile manner using a variety of types of computer-readable storage medium 112. The computer-readable medium 112 (also referred to as a processor-readable medium or storage) includes any non-transitory medium (e.g., a tangible medium) that participates in providing instructions or other data that may be read by the processor 106 of the computing platform 104. Computer-executable instructions may be compiled or interpreted from computer programs created using a variety of programming languages and/or technologies, including, without limitation, and either alone or in combination, JAVA, C, C++, C #, OBJECTIVE C, FORTRAN, PASCAL, JAVA SCRIPT, PYTHON, PERL, and PL/SQL.

The computing platform 104 may be provided with various features allowing the vehicle occupants to interface with the computing platform 104. For example, the computing platform 104 may include an audio input 114 configured to receive spoken commands from vehicle occupants through a connected microphone 116, and an auxiliary audio input 118 configured to receive audio signals from connected devices. The auxiliary audio input 118 may be a physical connection, such as an electrical wire or a fiber optic cable, or a wireless input, such as a BLUETOOTH audio connection or Wi-Fi connection. In some examples, the audio input 114 may be configured to provide audio processing capabilities, such as pre-amplification of low-level signals, and conversion of analog inputs into digital data for processing by the processor 106.

The computing platform 104 may also provide one or more audio outputs 120 to an input of an audio subsystem 122 having audio playback functionality. In other examples, the computing platform 104 may provide platform audio from the audio output 120 to an occupant through use of one or more dedicated speakers (not illustrated). The audio output 120 may include, as some examples, system generated chimes, pre-recorded chimes, navigation prompts, other system prompts, or warning signals.

The audio subsystem 122 may include an audio processor 124 configured to perform various operations on audio content received from a selected audio source 126 and to platform audio received from the audio output 120 of the computing platform 104. The audio processors 124 may be one or more computing devices capable of processing audio and/or video signals, such as a computer processor, microprocessor, a digital signal processor, or any other device, series of devices or other mechanisms capable of performing logical operations. The audio processor 124 may operate in association with a memory to execute instructions stored in the memory. The instructions may be in the form of software, firmware, computer code, or some combination thereof, and when executed by the audio processors 124 may provide audio recognition and audio generation functionality. The instructions may further provide for audio cleanup (e.g., noise reduction, filtering, etc.) prior to the processing of the received audio. The memory may be any form of one or more data storage devices, such as volatile memory, non-volatile memory, electronic memory, magnetic memory, optical memory, or any other form of data storage device.

The audio subsystem 122 may further include an audio amplifier 128 configured to receive a processed signal from the audio processor 124. The audio amplifier 128 may be any circuit or standalone device that receives audio input signals of relatively small magnitude, and outputs similar audio signals of relatively larger magnitude. The audio amplifier 128 may be configured to provide for playback through vehicle speakers 130 or headphones (not illustrated).

The audio sources 126 may include, as some examples, decoded amplitude modulated (AM) or frequency modulated (FM) radio signals, and audio signals from compact disc (CD) or digital versatile disk (DVD) audio playback. The audio sources 126 may also include audio received from the computing platform 104, such as audio content generated by the computing platform 104, audio content decoded from flash memory drives connected to a universal serial bus (USB) subsystem 132 of the computing platform 104, and audio content passed through the computing platform 104 from the auxiliary audio input 118. For instance, the audio sources 126 may also include Wi-Fi streamed audio, USB streamed audio, Bluetooth streamed audio, internet streamed audio, TV audio, as some other examples.

The computing platform 104 may utilize a voice interface 134 to provide a hands-free interface to the computing platform 104. The voice interface 134 may support speech recognition from audio received via the microphone 116 according to a standard grammar describing available command functions, and voice prompt generation for output via the audio subsystem 122. The voice interface 134 may utilize probabilistic voice recognition techniques using the standard grammar in comparison to the input speech. In many cases, the voice interface 134 may include a standard user profile tuned for use by the voice recognition functions to allow the voice recognition to be tuned to provide good results on average, resulting in positive experiences for the maximum number of initial users. In some cases, the system may be configured to temporarily mute or otherwise override the audio source specified by an input selector when an audio prompt is ready for presentation by the computing platform 104 and another audio source 126 is selected for playback.

The microphone 116 may also be used by the computing platform 104 to detect the presence of in-cabin conversations between vehicle occupants. In an example, the computing platform may perform speech activity detection, and then apply the results to a classification algorithm configured to classify the samples as either speech or non-speech. The classification algorithm may utilize various types of artificial intelligence algorithms, such as pattern matching classifiers, K nearest neighbor classifiers, as some examples.

The computing platform 104 may also receive input from human-machine interface (HMI) controls 136 configured to provide for occupant interaction with the vehicle 102. For instance, the computing platform 104 may interface with one or more buttons or other HMI controls configured to invoke functions on the computing platform 104 (e.g., steering wheel audio buttons, a push-to-talk button, instrument panel controls, etc.). The computing platform 104 may also drive or otherwise communicate with one or more displays 138 configured to provide visual output to vehicle occupants by way of a video controller 140. In some cases, the display 138 may be a touch screen further configured to receive user touch input via the video controller 140, while in other cases the display 138 may be a display only, without touch input capabilities.

The computing platform 104 may be further configured to communicate with other components of the vehicle 102 via one or more in-vehicle networks 142. The in-vehicle networks 142 may include one or more of a vehicle controller area network (CAN), an Ethernet network, or a media oriented system transfer (MOST), as some examples. The in-vehicle networks 142 may allow the computing platform 104 to communicate with other vehicle 102 systems, such as a telematics control unit 144 having a vehicle modem 145, a global positioning system (GPS) module 146 configured to provide current vehicle 102 location and heading information, and various vehicle electronic control units (ECUs) 148 configured to cooperate with the computing platform 104. As some non-limiting possibilities, the vehicle ECUs 148 may include a powertrain control module configured to provide control of engine operating components (e.g., idle control components, fuel delivery components, emissions control components, etc.) and monitoring of engine operating components (e.g., status of engine diagnostic codes); a body control module configured to manage various power control functions such as exterior lighting, interior lighting, keyless entry, remote start, and point of access status verification (e.g., closure status of the hood, doors, and/or trunk of the vehicle 102); a radio transceiver module configured to communicate with key fobs or other local vehicle 102 devices; and a climate control management module configured to provide control and monitoring of heating and cooling system components (e.g., compressor clutch and blower fan control, temperature sensor information, etc.).

As shown, the audio subsystem 122 and the HMI controls 136 may communicate with the computing platform 104 over a first in-vehicle network 142-A, and the telematics control unit 144, GPS module 146, and vehicle ECUs 148 may communicate with the computing platform 104 over a second in-vehicle network 142-B. In other examples, the computing platform 104 may be connected to more or fewer in-vehicle networks 142. Additionally or alternately, one or more HMI controls 136 or other components may be connected to the computing platform 104 via different in-vehicle networks 142 than shown, or directly without connection to an in-vehicle network 142.

A communications network 156 may provide communications services, such as packet-switched network services (e.g., Internet access, VoIP communication services), to devices connected to the communications network 156. An example of a communications network 156 may include a cellular telephone network.

The vehicle 102 may have network connectivity to the communications network 156 via the vehicle modem 145. To facilitate the communications over the communications network 156, the vehicle 102 may be associated with unique device identifiers (e.g., mobile device numbers (MDNs), Internet protocol (IP) addresses, etc.) to identify the communications of the vehicles 102 over the communications network 156.

The computing platform 104 may also be configured to perform vehicle-to-vehicle (V2V) communication with other vehicles 102. In many examples, the computing platform 104 may include a wireless transceiver 150 configured to communicate with a compatible wireless transceiver 150 of other vehicles 102 (e.g., via dedicated short-range communication (DSRC), classic BLUETOOTH, ZIGBEE, Wi-Fi, BLUETOOTH Low Energy (BLE), or another short range wireless protocol).

A data collection server 162 may include various types of computing apparatus, such as a computer workstation, a server, a desktop computer, a virtual server instance executed by a mainframe server, or some other computing system and/or device. Similar to the computing platform 104, the data collection server 162 may include a memory on which computer-executable instructions may be maintained, where the instructions may be executable by one or more processors of the data collection server 162. As discussed in detail below, the data collection server 162 may be configured to receive data from a plurality of vehicles 102.

A data collection application 176 may be an example of a vehicle application installed to the storage 112 of the computing platform 104. While the data collection application 176 is shown as a software application installed to the computing platform 104, in other examples use management may be handled by a dedicated electronic control unit (ECU) or part of another ECU that provides additional vehicle 102 functionality. As discussed in detail below, when executed by the vehicle 102, the data collection application 176 may cause the vehicle 102 to collect data over the in-vehicle networks 142 from the ECUs 148 to be provided to the data collection server 162. This data may be referred to herein as collected data 178. The data collection application 176 may be further programmed to perform data swapping functionality using V2V communication, as described in detail with regard to FIGS. 2-4. The data that is swapped between vehicles 102 may be referred to as swapped data 180. The data collection application 176 may be further programmed to cause the vehicle 102 to send the swapped data 180 to the data collection server 162 for analysis.

Figure 2:
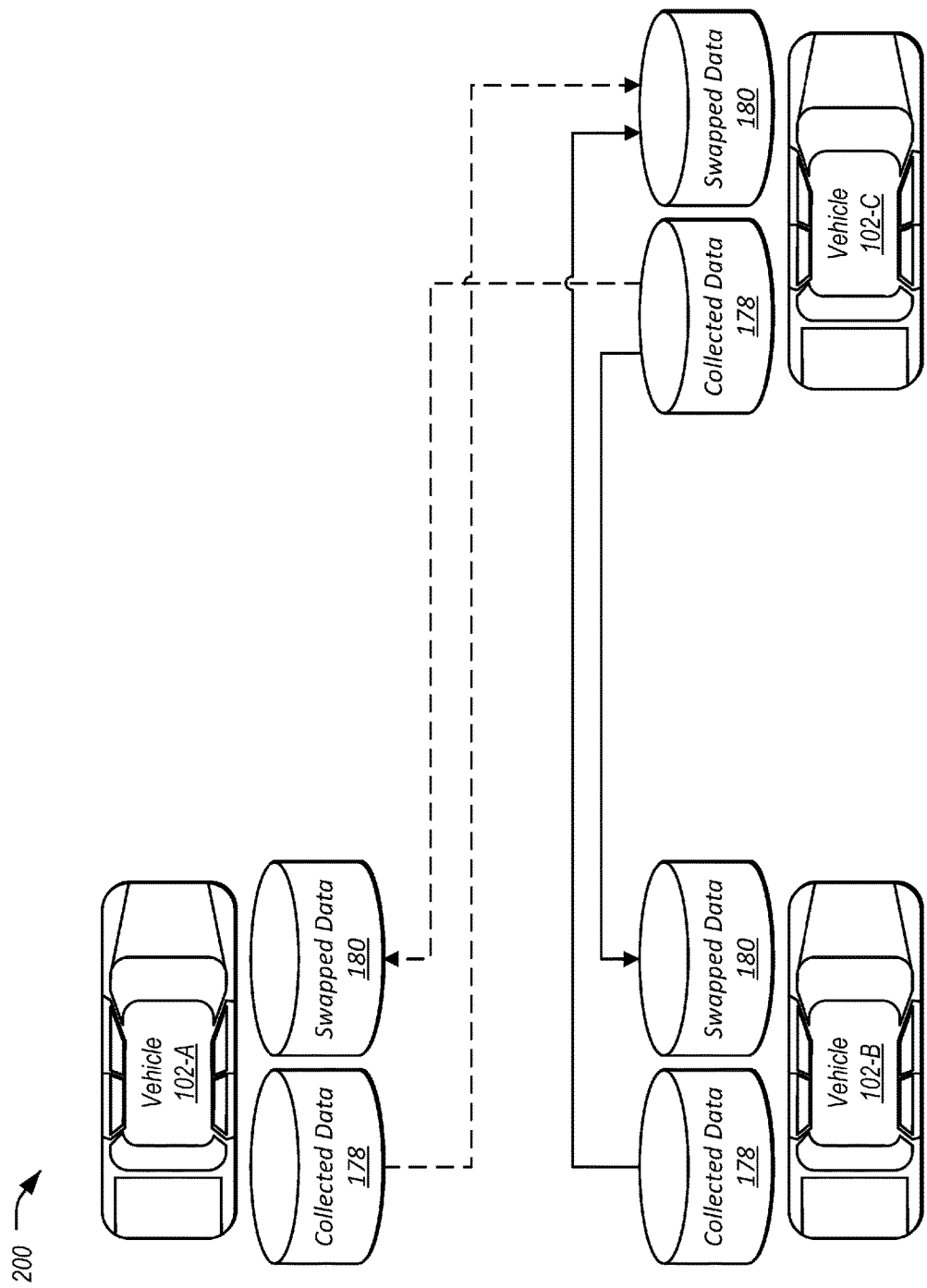
FIG. 2 illustrates an example diagram of three vehicles swapping collected data with one another.

FIG. 2 illustrates an example diagram 200 of three vehicles 102-A, 102-B, 102-C (collectively 102) swapping collected data 178 with one another. As shown, each of the vehicles 102-A, 102-B, and 102-C is storing collected data 178 and swapped data 180. More specifically, the vehicle 102-A has swapped a portion of its collected data 178 with the vehicle 102-C. The collected data 178 from vehicle 102-A that is sent to vehicle 102-C becomes swapped data 180 of vehicle 102-C, and the collected data 178 from vehicle 102-C that is sent to vehicle 102-A becomes swapped data 180 of vehicle 102-A. Similarly, the vehicle 102-B has also swapped a portion of its collected data 178 with the vehicle 102-C. Here also, the collected data 178 from vehicle 102-B that is sent to vehicle 102-C becomes swapped data 180 of vehicle 102-C, and the collected data 178 from vehicle 102-C that is sent to vehicle 102-B becomes swapped data 180 of vehicle 102-B. Notably, these data swaps may be performed using vehicle-to-vehicle communication.

Each of the vehicles 102 may send whatever swapped data 180 they have over the communications network 156 to the data collection server 162. In an example, the vehicles 102 may be programmed via the data collection application 176 to send the swapped data 180 to the data collection server 162 during a predefined time period. For instance, the predefined time period may be the evening hours of 10 PM to 3 AM. In some examples, the data sending may be performed at a random time within the predefined time period.

Figure 3:
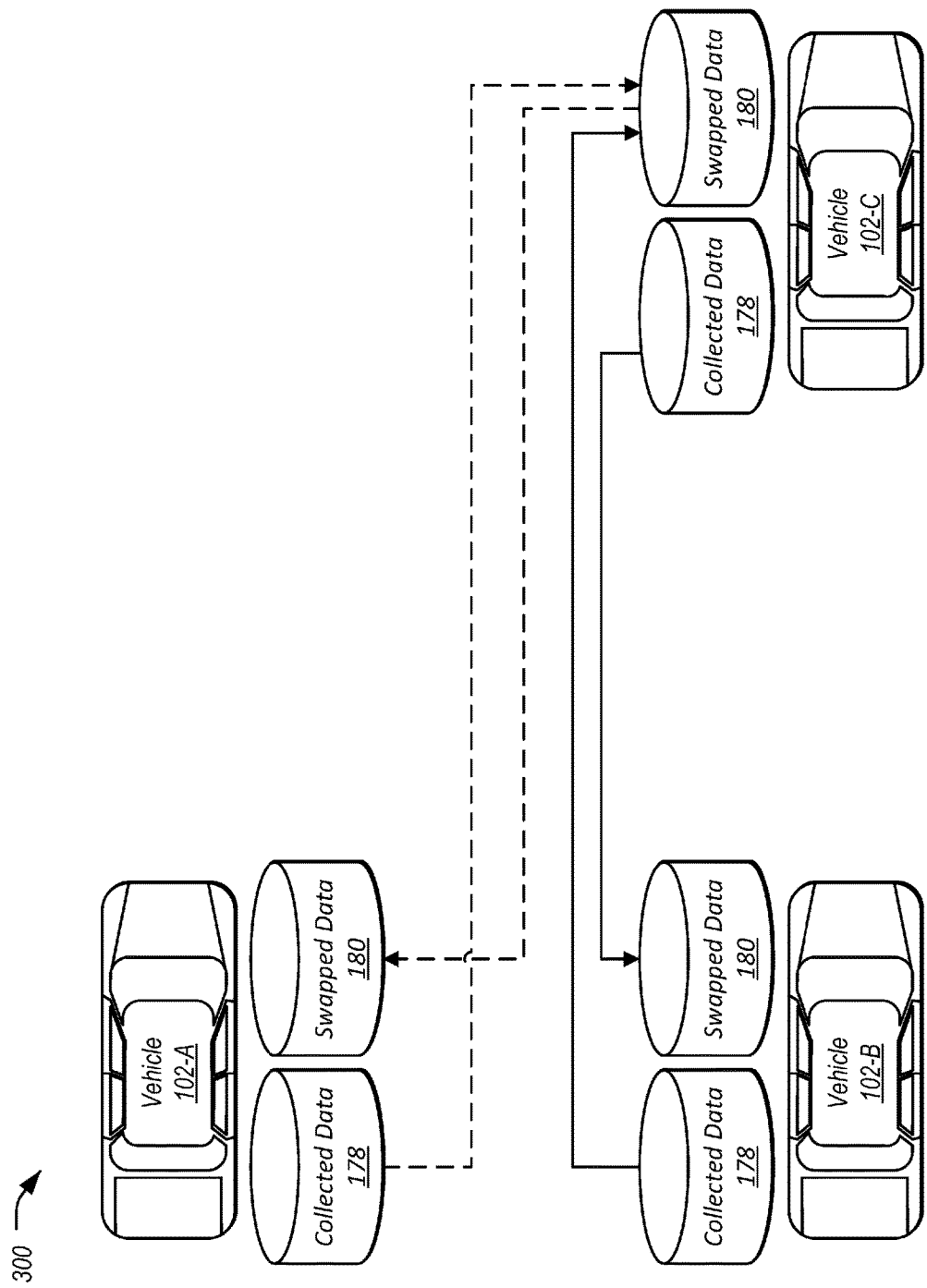
FIG. 3 illustrates an example diagram of three vehicles swapping both collected data and swapped data with one another.

FIG. 3 illustrates an example diagram 300 of three vehicles 102-A, 102-B, 102-C (collectively 102) swapping both collected data 178 and swapped data 180 with one another. As shown, each of the vehicles 102-A, 102-B, and 102-C is storing collected data 178 and swapped data 180. Similar to the diagram 200, the vehicle 102-B has swapped a portion of its collected data 178 with the vehicle 102-C. However, the vehicle 102-C has swapped a portion of its swapped data 180 with collected data 178 of the vehicle 102-A. Accordingly, it can be seen that vehicles 102 can both swap collected data 178 that they have collected themselves and also swap data that has previously been swapped with other vehicles 102.

Figure 4:
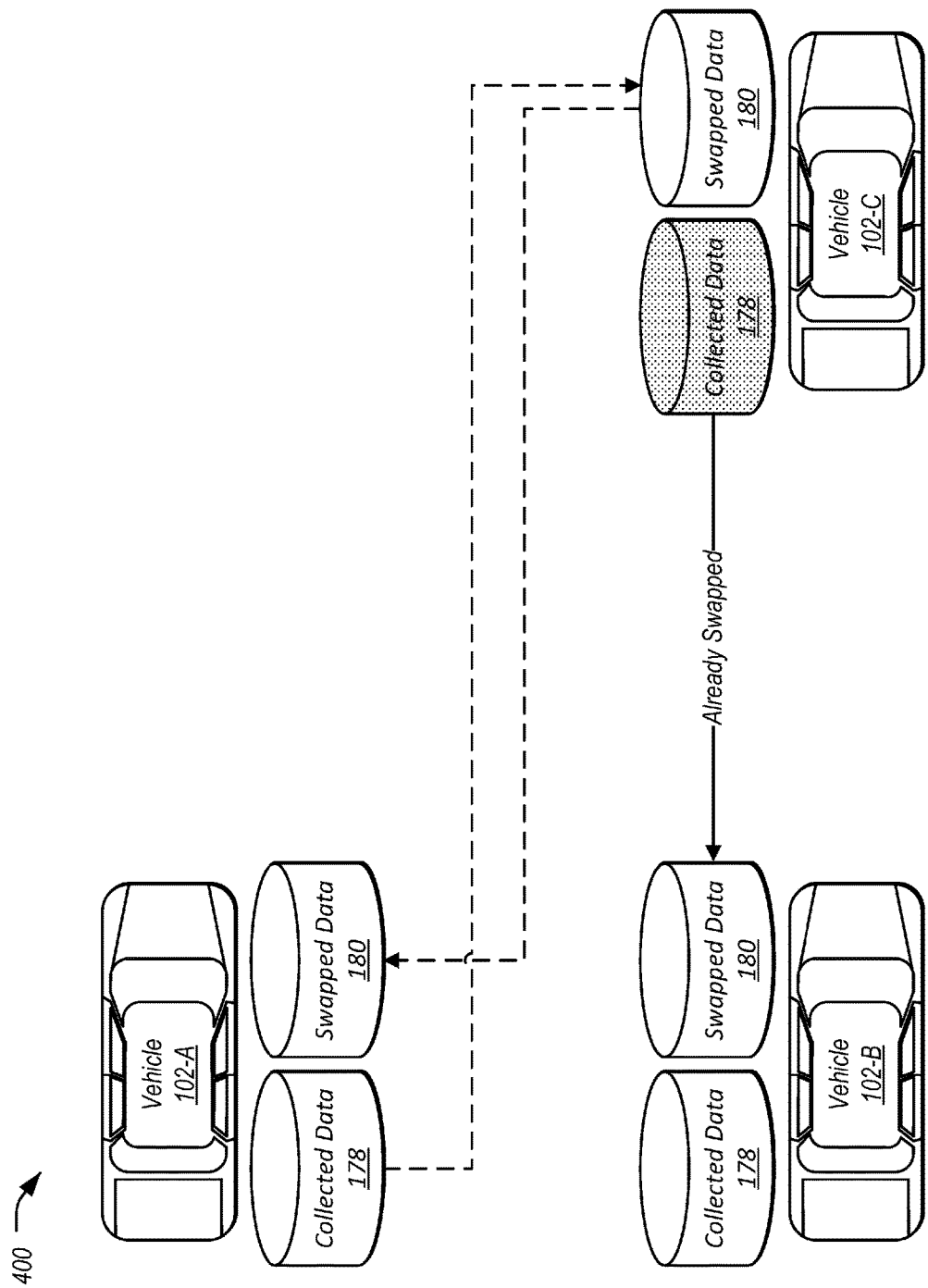
FIG. 4 illustrates an example diagram of three vehicles swapping collected data where one of the vehicles no longer has additional data to swap.

FIG. 4 illustrates an example diagram 400 of three vehicles 102-A, 102-B, 102-C swapping collected data 178 where one of the vehicles 102-C no longer has additional data to swap. This may occur, for example, if one of the vehicles 102 (as shown, the vehicle 102-C) has not collected additional collected data 178, or as another possibility, if the vehicle 102-C has previously swapped with the same other vehicle 102 (e.g., vehicle 102-B) without an intervening transfer of data off the vehicle 102-C.

Figure 5:
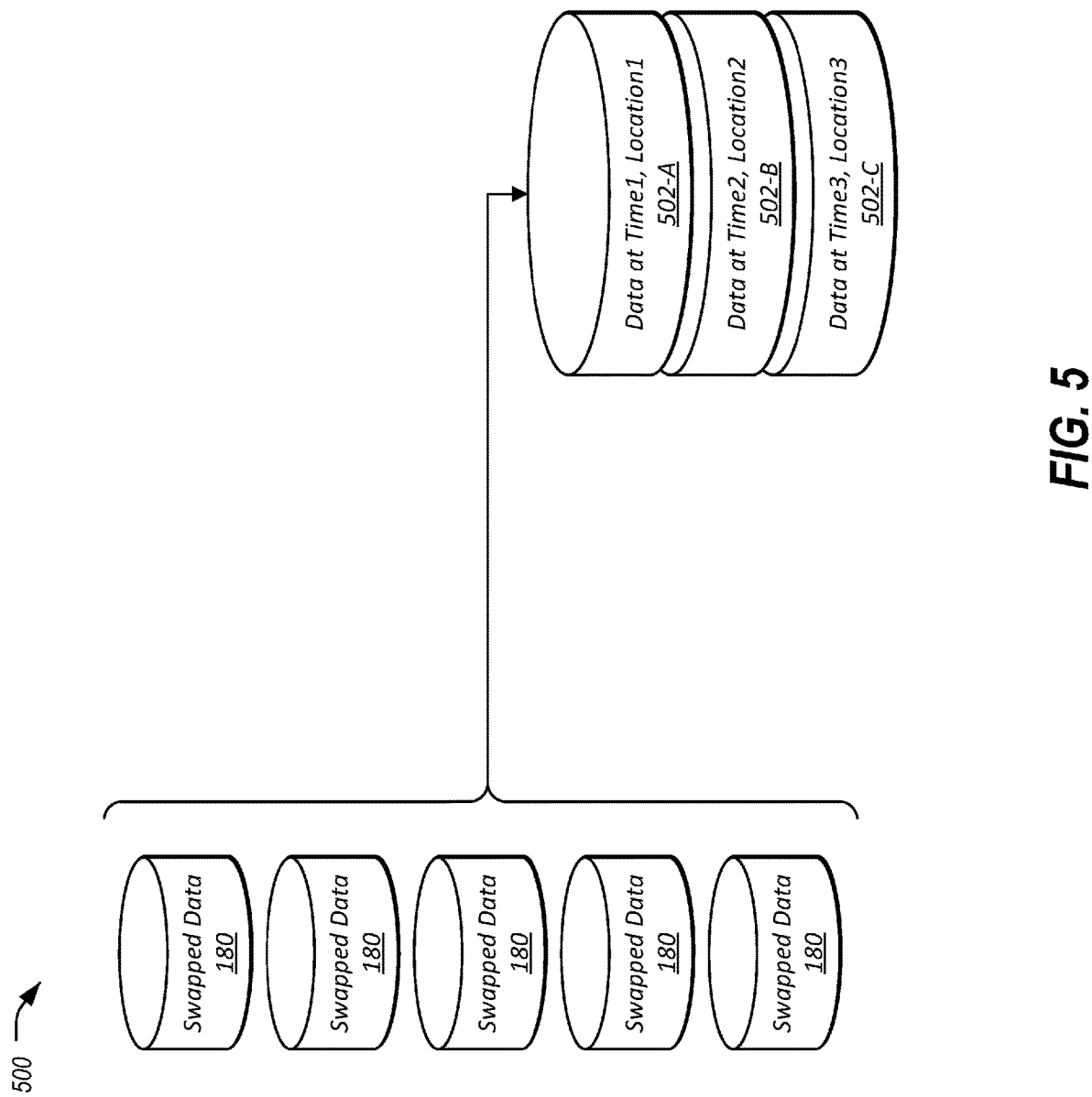
FIG. 5 illustrates an example diagram of swapped data compiled into collections by the data collection server.

FIG. 5 illustrates an example diagram 500 of swapped data 180 compiled into collections 502-A, 502-B, 5602-C (collectively 502) by the data collection server 162. The swapped data 180 may be received from a plurality of vehicles 102 as described above and may be collated into data sets according to information such as included time period and location of the data collection. As shown, data from the swapped data 180 is collected into a first collection 502-A relating to a first time period and a first location, a second collection 502-B relating to a second time period and a second location, and a third collection 502-C relating to a third time period and a third location.

Figure 6:
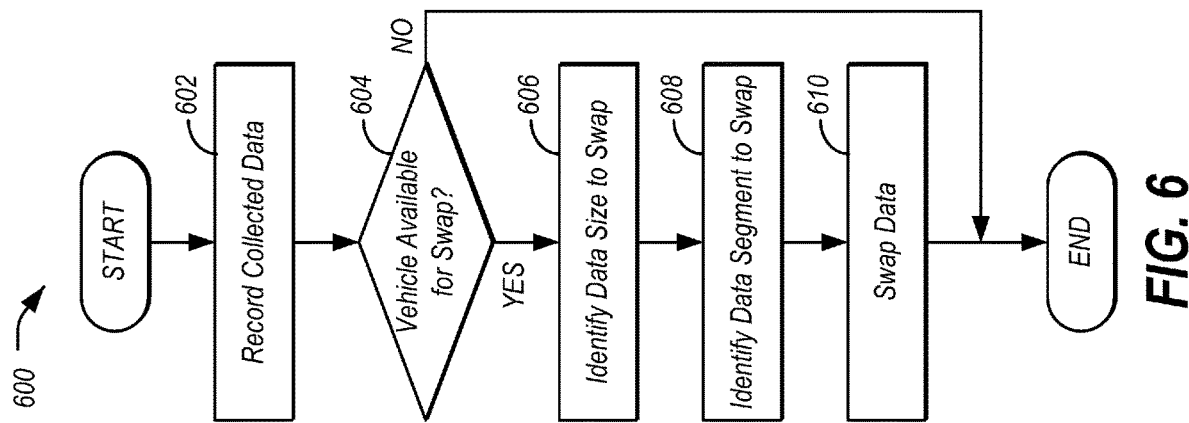
FIG. 6 illustrates an example process for swapping data between vehicles.

FIG. 6 illustrates an example process 600 for swapping data between vehicles 102. In an example, the process 600 may be performed by one of the vehicles 102 discussed above. It should be noted that while the process 600 is described as a sequence of steps from a start to an end, the process 600 may be performed repetitively in a loop, and/or with operations in a different order than as shown.

At 602, the vehicle 102 records collected data 178. In an example, the data collection application 176 of the computing platform 104 may utilize the connection of computing platform 104 to the vehicle networks 142 to monitor the vehicle networks 142 for data. The data collection application 176 may store this data to the storage 112 of the computing platform 104 as collected data 178.

At operation 604, the vehicle 102 determines whether another vehicle 102 is available to perform a data swap. In an example, the data collection application 176 of the computing platform 104 may utilize the wireless transceiver 150 to broadcast a message via V2V communication querying for other vehicles 102 in the vicinity. Responsive to receipt of a response from another vehicle 102, control passes to operation 606. Otherwise, the process 600 ends.

The vehicle 102 identifies a size of data to swap at 606. In an example, the vehicle 102 may request via V2V communication for the located vehicle 102 to respond with an indication of the size of data stored by the located vehicle 102 that is available for swapping. The located vehicle 102 may respond with the result via V2V communication.

At 608, the vehicle 102 identifies a data segment to swap. In an example, the vehicle 102 may identify how much data the vehicle 102 itself has available for swapping, and may compare that to the amount of data indicated by the located vehicle 102 to identify the minimum value between those two sizes. This may be done to allow the vehicles 102 to swap data segments of identical size. In one example, the vehicle 102 may determine to swap the entire amount of data that can be evenly swapped between the vehicles 102. In another example, the vehicle 102 may determine to swap a size of data less than the total possible amount that is available to swap. This may be done randomly, or based on one or more factors, such as bandwidth between the vehicles 102. In other examples, the process described for operation 608 may be performed with the located vehicle 102 making the determination of how much data to swap.

At operation 610, the vehicle 102 swaps the data with the other vehicle 102. In an example, the vehicle 102 and the located vehicle 102 swap data via V2V communication. After operation 610, the process 600 ends.

Figure 7:
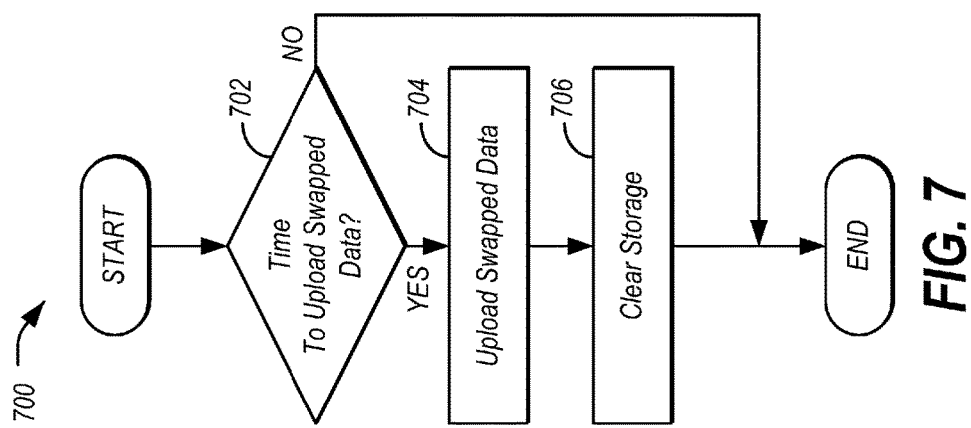
FIG. 7 illustrates an example process for uploading swapped data from the vehicle to the data collection server.

FIG. 7 illustrates an example process 700 for uploading swapped data from the vehicle 102 to the data collection server 162. As with the process 600, the process 700 may be performed by the vehicle 102.

At operation 702, the vehicle 102 determines whether it is a time to upload swapped data 180 to the data collection server 162. In an example, the vehicles 102 may be programmed via the data collection application 176 to send the swapped data 180 to the data collection server 162 during a predefined time period. For instance, the predefined time period may be the evening hours of 10 PM to 3 AM. In some examples, the data sending may be performed at a random time within the predefined time period.

At 704, the vehicle 102 uploads the swapped data 180 to the data collection server 162. In an example, the vehicle 102 sends the swapped data 180 to the data collection server 162 over the communications network 156. Notably, as in many examples, the swapped data 180 is of a same size in bytes as the collected data 178, and the vehicle 102 does not expend additional data in transmitting the swapped data 180 as compared to transmitting its own data.

The vehicle 102 clears the storage of swapped data 180 at 706. In an example, responsive to successful transmission of the swapped data 180 to the data collection server 162, the vehicle 102 deletes the swapped data 180 from the storage 112. This allows for the storage 112 to have capacity to store additional collected data 178 and swapped data 180. After operation 706, the process 700 ends.

Figure 8:
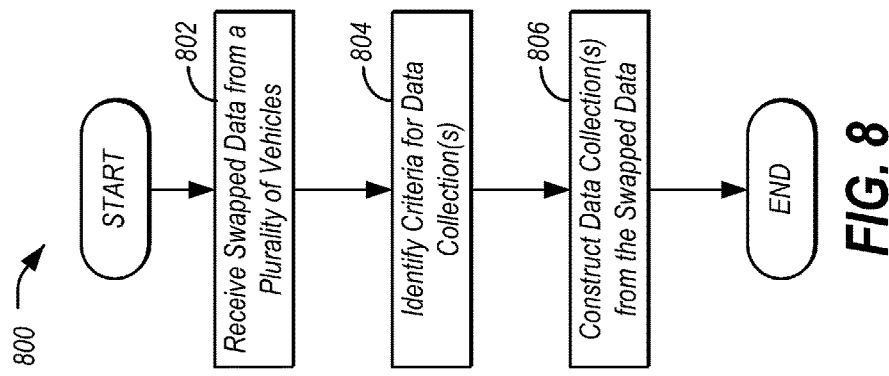
FIG. 8 illustrates an example process for compiling of data from the swapped data received by the data collection server.

FIG. 8 illustrates an example process 800 for compiling collections 502 from the swapped data 180 received by the data collection server 162. In an example, the process 800 may be performed by the data collection server 162 as discussed in detail above.

At 802, the data collection server 162 receives swapped data 180 from a plurality of vehicles 102. In an example, the data collection server 162 receives swapped data 180 using the process 700 as discussed in detail above.

At operation 804, the data collection server 162 identifies criteria for the creation of data collections 502. In an example, the data collection server 162 may receive a request for a collection of data related to a specified location and/or time. In another example, the data collection server 162 may be programmed to cluster the received swapped data 180 according to location and/or time, and provide data collections 502 according to the identified clusters.

At 806, the data collection server 162 constructs data collections from the swapped data 180. In an example, the data collection server 162 constructs the data collections from the swapped data 180 according to the criteria identified in operation 804. After operation 806, the process 800 ends.

Computing devices described herein generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, JAVA™, C, C++, C #, VISUAL BASIC, JAVA SCRIPT, PERL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for providing anonymity for sending data from vehicles to a cloud service by applying data swapping techniques, comprising:
a processor of a first vehicle programmed to
record collected data from a plurality of vehicle systems,
locate a second vehicle, available over vehicle-to-vehicle communication, to swap data with the first vehicle,
identify a size of collected data to swap and a segment of data to swap of the identified size,
swap the collected data with the second vehicle to receive swapped data of the same size from the second vehicle, disguising the true origin of the swapped data, and
send the collected data, including the swapped data, over a communications network to a data collection server.

2. The system of claim 1, wherein the processor is further programmed to:
receive, from the second vehicle, an amount of data stored to the second vehicle,
identify an amount of data stored to the first vehicle, and
identify the size of collected data to swap as the minimum of the amount of data stored to the first vehicle and the amount of data is stored to the second vehicle.

3. The system of claim 1, wherein the processor is further programmed to:
locate a third vehicle available over vehicle-to-vehicle communication to swap data with the first vehicle,
identify a size of collected data to swap and a segment of data to swap of the identified size,
swap the collected data with the third vehicle to receive swapped data of the same size from the third vehicle, and
send the collected data including the swapped data received from the second vehicle and the third vehicle over a communications network to the data collection server.

4. The system of claim 1, wherein the collected data includes both information indicative of a location of the first vehicle at which the data was collected, and information indicative of a time at which the data was collected.

5. The system of claim 1, wherein the vehicle-to-vehicle communication is performed using dedicated short-range communication (DSRC).

6. The system of claim 1, wherein the processor of the first vehicle is further programmed to randomly determine the segment of the data to swap.

7. The system of claim 6, wherein which segment of swapped data of the same size from the second vehicle to be sent to the first vehicle is determined randomly by the second vehicle.

8. A method for providing anonymity for sending data from vehicles to a cloud service by applying data swapping techniques, comprising:
identifying, over vehicle-to-vehicle communication between first and second vehicles, a size of collected data to swap;
swapping, over the vehicle-to-vehicle communication between the first and second vehicles, a first segment of data of the size stored to the first vehicle with a second segment of data of the size stored to the second vehicle, disguising the true origin of the swapped data; and
sending, from the first vehicle to a server, the collected data including the swapped data received from the second vehicle.

9. The method of claim 8, further comprising identifying the second vehicle by the first vehicle using vehicle-to-vehicle communication.

10. The method of claim 8, further comprising:
receiving, from the second vehicle, an amount of data stored to the second vehicle,
identifying an amount of is stored to the first vehicle, and
identifying the size of collected data to swap as the minimum of the amount of data stored to the first vehicle and the amount of data stored to the second vehicle.

11. The method of claim 8, further comprising:
identifying, over vehicle-to-vehicle communication between the first vehicle and a third vehicle, a second size of collected data to swap;
swapping, over the vehicle-to-vehicle communication between the first and third vehicles, a third segment of data of the second size stored to the first vehicle with a fourth segment of data of the second size stored to the third vehicle; and
sending, from the first vehicle to a server, the collected data including the swapped data received from the third vehicle.

12. The method of claim 11, wherein at least a subset of the data in the third segment of data swapped to the third vehicle is data from the second segment of data received from the second vehicle.

13. The method of claim 8, wherein the collected data includes both information indicative of a location of the first vehicle at which the data was collected, and information indicative of a time at which the data was collected.

14. A non-transitory computer-readable medium comprising instructions for providing anonymity for sending data from vehicles to a cloud service by applying data swapping techniques that, when executed by a processor of a vehicle, causes the vehicle to:
identify, over vehicle-to-vehicle communication between first and second vehicles, a size of collected data to swap;
swap, over the vehicle-to-vehicle communication between the first and second vehicles, a first segment of data of the size stored to the first vehicle with a second segment of data of the size stored to the second vehicle, disguising the true origin of the swapped data; and
send, from the first vehicle to a server, the collected data including the swapped data received from the second vehicle.

15. The medium of claim 14, further comprising instructions that, when executed by the processor of the vehicle, causes the vehicle to identify the second vehicle by the first vehicle using vehicle-to-vehicle communication.

16. The medium of claim 14, further comprising instructions that, when executed by the processor of the vehicle, causes the vehicle to:
receive, from the second vehicle, how much data is stored to the second vehicle,
identify how much data is stored to the first vehicle, and
identify the size of collected data to swap as the minimum of how much data is stored to the first vehicle and how much data is stored to the second vehicle.

17. The medium of claim 14, further comprising instructions that, when executed by the processor of the vehicle, causes the vehicle to:
- identify, over vehicle-to-vehicle communication between the first vehicle and a third vehicle, a second size of collected data to swap;
- swap, over the vehicle-to-vehicle communication between the first and third vehicles, a third segment of data of the second size stored to the first vehicle with a fourth segment of data of the second size stored to the third vehicle; and
- send, from the first vehicle to a server, the collected data including the swapped data received from the third vehicle.

18. The medium of claim 17, wherein at least a subset of the data in the third segment of data swapped to the third vehicle is data from the second segment of data received from the second vehicle by the vehicle.

19. The medium of claim 17, wherein the second size is the same as the first size, the third segment being swapped after the first vehicle has received the second segment from the second vehicle.

20. The medium of claim 17, wherein the second size is different from the first size.

21. The medium of claim 14, wherein the collected data includes both information indicative of a location of the first vehicle at which the data was collected, and information indicative of a time at which the data was collected.

* * * * *